United States Patent [19]

Feint

[11] Patent Number: 5,130,023

[45] Date of Patent: Jul. 14, 1992

[54] FILTER CARTRIDGE WITH END DENSIFICATION RING

[75] Inventor: Stephen D. Feint, Cortland, N.Y.

[73] Assignee: Pall Corporation, Glen Cove, N.Y.

[21] Appl. No.: 332,604

[22] Filed: Apr. 3, 1989

[51] Int. Cl.⁵ .................................................. B01D 27/06
[52] U.S. Cl. .................................. 210/493.2; 210/493.5;
55/500; 55/521
[58] Field of Search ................ 210/493.1, 493.2, 493.5,
210/508; 55/500, 521, 475

[56] References Cited

U.S. PATENT DOCUMENTS

| | | | |
|---|---|---|---|
| 2,801,009 | 7/1957 | Bowers | 210/493 |
| 3,241,680 | 3/1966 | Humbert | 210/457 |
| 3,354,012 | 11/1967 | Forman | 156/69 |
| 3,397,793 | 8/1968 | MacDonnell | 210/457 |
| 3,865,919 | 2/1975 | Pall et al. | 264/259 |
| 3,867,294 | 2/1975 | Pall et al. | 210/489 |
| 4,154,688 | 5/1979 | Pall | 210/487 |
| 4,392,958 | 7/1983 | Ganzi et al. | 210/493.2 |
| 4,402,830 | 9/1983 | Pall | 210/457 |
| 4,522,719 | 6/1985 | Kuwajima et al. | 210/493.1 |
| 4,861,479 | 8/1989 | Solzer | 210/485 |
| 4,929,354 | 5/1990 | Meyering et al. | 210/493.2 |

FOREIGN PATENT DOCUMENTS

| | | |
|---|---|---|
| 0112558 | 12/1983 | European Pat. Off. . |
| 3739297 | 11/1988 | Fed. Rep. of Germany . |
| 1494857 | 4/1967 | France . |
| 764254 | 1/1955 | United Kingdom . |
| 880469 | 3/1960 | United Kingdom . |
| 970409 | 11/1961 | United Kingdom . |
| 1003164 | 10/1962 | United Kingdom . |
| 1086590 | 11/1965 | United Kingdom . |
| 1357723 | 6/1971 | United Kingdom . |
| 2110555A | 11/1982 | United Kingdom . |

Primary Examiner—Robert A. Dawson
Assistant Examiner—Wanda L. Millard
Attorney, Agent, or Firm—Leydig, Voit & Mayer

[57] ABSTRACT

A filter cartridge comprising a pleated, cylindrical filter element is provided with an end densification ring to cause the ends of the pleats to pack together more tightly. In this configuration they can be more easily and securely sealed in an end cap closing off an end of the filter cartridge.

37 Claims, 4 Drawing Sheets

FIG. 5

FILTER CARTRIDGE WITH END DENSIFICATION RING

TECHNICAL FIELD

This invention relates to pleated cylindrical filter elements and specifically the means by which such filter elements are sealed into filter devices containing them.

BACKGROUND TO THE INVENTION

Cylindrical filters are widely used to filter fluids and comprise a cylindrical housing containing a replaceable filter cartridge, which cartridge comprises a porous cylindrical core member and a pleated filter element surrounding the core. The axes of the pleats are generally parallel to the axis of the core. In normal operation an inlet port communicates with the interior of the housing and an outlet port communicates with the porous axial core member such that the fluid to be filtered is constrained to pass from inlet to outlet through the cylindrical pleated filter element. To ensure that no fluid passes around the ends of the filter element, these are usually sealed into end caps at each end of the cartridge. The end cap through which the outlet port communicates with the axial core member is called the open end cap and the other, which seals off the other end of the core, is called the blind end cap. In some constructions the axial core member has exit ports at both ends as, for example, when a plurality of cartridges are joined together to provide a longer filter device The sealing of the ends of the filter element in the end caps is frequently done by placing in the cap a potting compound, which in this context means a material that is liquid under filter cartridge-sealing conditions but solid under normal operating conditions. Typically this will be a molten polymer, a plastisol, a two-part epoxy resin, a wax, a liquid polymer that can quickly be cured to a rigid state, or some such similar material In one preferred embodiment, the potting compound is in fact the material of the end cap itself. In this embodiment, the surface of the end cap to which the pleats are to be bonded is melted and the pleats are pressed into the molten surface. The end cap is then allowed to cool.

In order for this sealing process to be effective, it is necessary that the end of each pleat be firmly anchored in the potting compound and in practice this means ensuring that all the ends of the pleats penetrate into the compound to approximately equal depth and stay there until the compound solidifies.

In some cases this proves a difficult objective. The viscosity of the potting material may be so high or the rigidity of the filter element so low that the pleats may actually buckle before adequate penetration can be achieved. This problem is exacerbated where the pleats are relatively widely spaced so as to accommodate dirt removed from a filtered fluid.

The present invention provides a means of increasing the ability of a cylindrical pleated filter element to resist buckling when the end is inserted into a potting compound to seal it in place in an end cap of a filtration cartridge. In addition, the extrusion of potting material between the individual pleats is more uniform and controllable.

Another objective is to improve the uniformity of performance of filtration cartridges containing a cylindrical pleated filter element by insuring a reduced rate of filter failure as a result of filtration fluid bypassing the filter element through inadequate end seals.

DESCRIPTION OF THE INVENTION

The above objectives are obtained by providing a filter cartridge comprising a porous cylindrical core member, end caps at opposed ends of the cartridge, and, disposed around the axial core member and retained in the cartridge by the end caps, a cylindrical pleated filter element with the axes of the pleats extending generally parallel to the axis of the core member, and an end densification ring with a generally wedge-shaped cross-section location in the area adjacent at least one end cap so as to restrict the local radial dimension of the space occupied by the pleated filter element such that the portions of the pleats in contact with the ring are reshaped and compacted in close proximity to one another.

The end densification ring may be a separate component or it may be an integral part of the core member. The ring, which is of a generally wedge-shaped cross-section, displaces the ends of the pleats of the filter element to one side, (circumferentially clockwise or counterclockwise), so as to realign them at an angle to the radial direction. In practice this realignment results in the pleats being forced in the area of the densification ring to be packed in close proximity to one another. In this configuration they have a much greater ability to resist buckling of the individual pleats or bending over of the ends of the pleats when the ends are forced into the potting compound and the extrusion of potting compound between the pleats is more uniform and controllable.

The end densification ring is located adjacent at least one end of the filter element. In preferred embodiments, end densification rings are provided at both ends of the filter element. The end densification ring acts by restricting the local radial dimensions of the space occupied by the pleated filter element such that the pleats are forced by contact with the ring to be reshaped and compacted in close proximity to one another. It will be appreciated that this may be most conveniently done by attaching the densification ring to the core member. It will however be understood that a similar result may be obtained by restricting the radial dimensions of the space by applying the densification ring to the inner surface of a cage member surrounding the cylindrical pleated filter element and sealed with it into the end caps. This, however, is a less preferred embodiment of the invention.

The end densification ring has a generally wedge-shaped cross-section. In some embodiments, however, it is preferred that the end densification ring be fitted onto a rabbeted end of the axial core member. In this event the wedge-shaped cross-section of the end densification ring will conveniently be truncated with the extent of the truncation corresponding to the depth of the rabbet. In general, therefore, it is preferred that the densification ring act to increase the effective local diameter of the core member at its end. This increase is preferably done gradually with the maximum restriction of the space occupied by the filter medium to be found at the axial end of the core member. The wedge angle, that is to say, the acute angle subtended by the outside surface of the ring and the hypothetically continued surface of the core member without the ring, is preferably from about 15° to about 30°, such as from about 18° to about 23°.

The densification factor (as this term is hereinafter defined), achieved by the use of the end densification ring, is preferably from about 0.5 to about 1.1 and most preferably from about 0.70 to about 0.90.

While the densification ring has been described in terms of a wedge-shaped cross-section, it is to be understood that this includes configurations that approximate the wedge shape such as those in which the external surface of the ring, when seen in cross-section, has a concave configuration.

The end densification rings can be made of a variety of materials that will retain their structural integrity at the temperatures at which the end caps are applied. In general polymeric material is satisfactory, such as polyethylene, polypropylene, polytetrafluoroethylene, and polyfluorinated alkyl vinyl ether polymers and copolymers.

In one preferred embodiment the rings are provided with slots to allow for the escape of gases which might otherwise be trapped in the pleat ends by application thereto of a solid ring. This is particularly important when the filter is oriented vertically in a system and is used to filter carefully metered volumes of liquid.

The pleated filter element used in the invention can be made of any suitable medium such as polymeric fibers, glass fibers, cellulosic or mixed fibers, or metal fibers. It may also be in the form of a porous metal membrane. The pleated filter element may also comprise support material such as non-woven or woven fabrics including those made from metal or polymeric materials and/or extruded webbings. The invention is particularly useful in the context of a cylindrical pleated depth filter medium formed of polymeric microfibers which are physically entangled to define a tortuous filtration path for the fluid passing therethrough. As indicated above, the potting compound into which the ends of the pleats are sealed can be any compound that is liquid under sealing conditions but which under use conditions is a solid. Thus, it can be a plastisol, a two-part epoxy resin, a wax, or some other such material. A preferred expedient is to melt a surface of the end cap and, while the surface is molten, press the pleats into it until the ends are completely and uniformly covered.

The porous core member may be made of a molded plastic such as a polyolefin, a fluoropolymer, a nylon, or a polyester. Alternatively, it may be made of a metal mesh, a perforated sheet of metal such as steel or aluminum, or a porous ceramic or any one of a number of porous rigid materials adapted to form a support for the cylindrical pleated filter element.

As explained above, the end densification ring can be integral with the core member or the cage or it can be applied separately, preferably with a locking fit, to the core member. Whatever the embodiment it is preferred that, when the pleated filter element is first forced into contact with the end densification ring, the movement is accompanied by a slight rotational movement about the filter axis, perhaps of up to 45°, and preferably from about 20° to about 30°, so as to assist the pleats to be reshaped and compacted in a uniform manner.

DESCRIPTION OF THE DRAWINGS

The invention is further described with specific reference to the attached drawings in which:

FIG. 2a is a cross-section of an end densification ring according to the invention and FIG. 2b is a plan view of the end densification ring illustrated in FIG. 2a.

As shown in FIG. 3, the radial dimension is uniformly restricted for the pleats at the upper end of the filter element.

Figure 1:
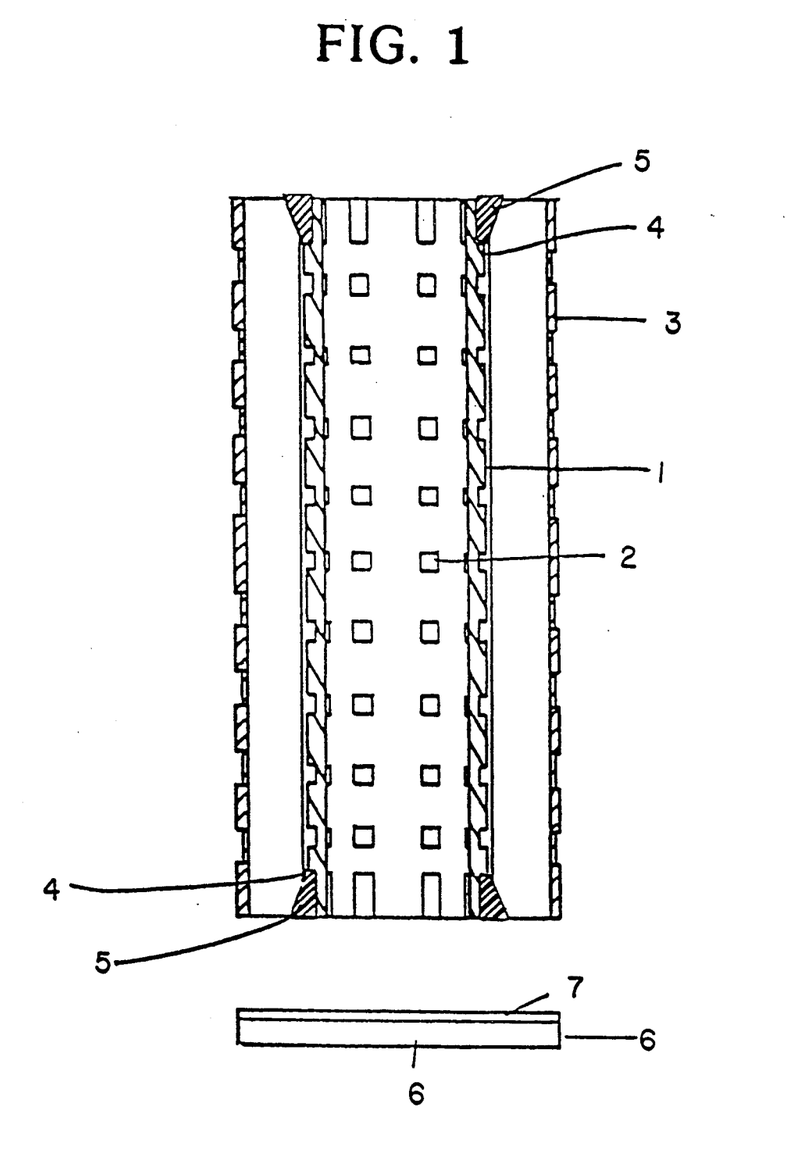
FIG. 1 is an exploded cross-section of part of a filtration cartridge according to the invention.
Figure 2A:
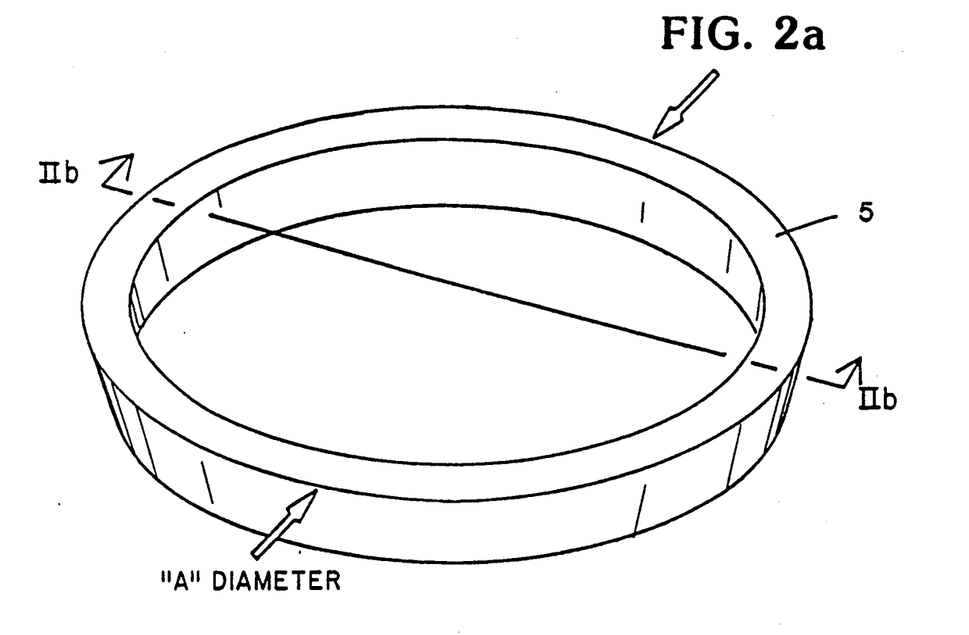
Figure 2B:
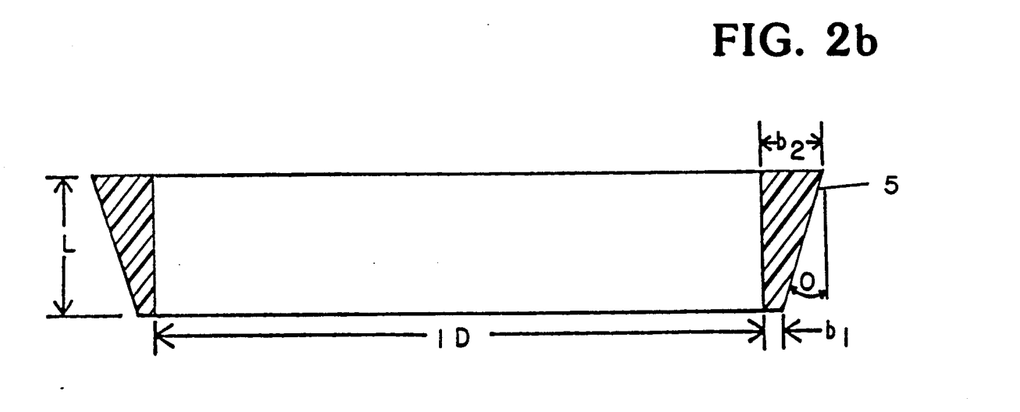
Figure 3:
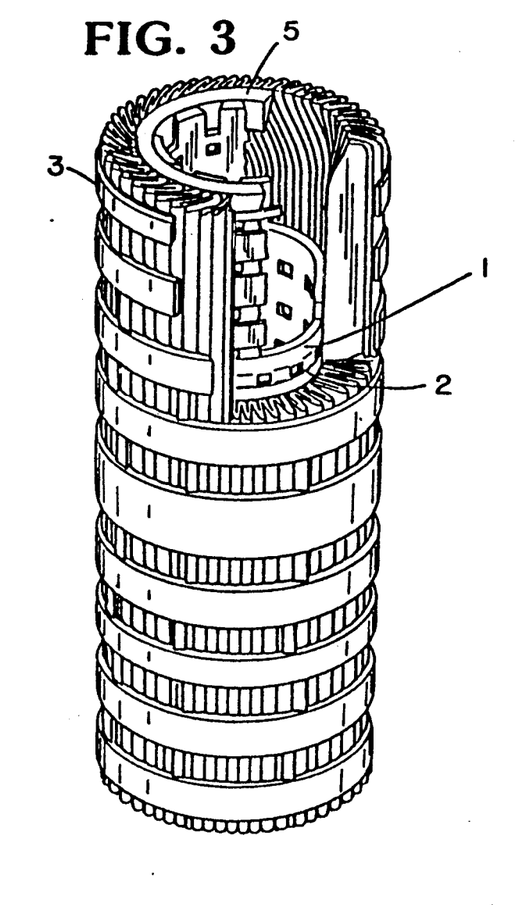
FIG. 3 is a perspective view of a filter cartridge of the invention with a cutaway portion in cross-section showing the pleats of a cylindrical pleated filter element as they appear in the bulk of the filter element, (i.e., non-densified), and also in the portion adjacent the end densification ring in which the pleats are laid over on one another and compacted.
Figure 4:
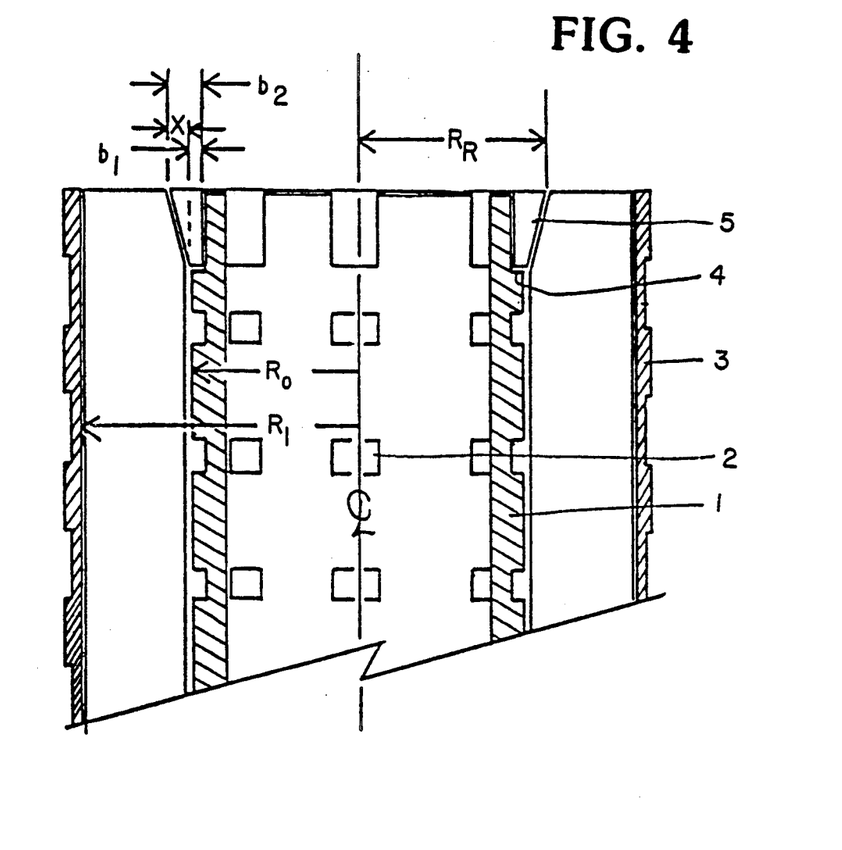
FIG. 4 is a schematic cross-section of an end of the filter cartridge according to the invention and is provided to identify the various dimensions referred to in the specification.

In the embodiment illustrated in FIG. 1, which incorporates an end densification ring as shown in FIGS. 2a, 2b and 4, a cylindrical core member 1, provided with apertures 2, is surrounded by a pleated filter element (not shown) located between the core member and a cage member 3. The function of the cage member is to contain and protect the pleated filter element against sudden pressure fluctuations. The core member is provided with a rabbeted portion 4 adjacent its end, and an end densification ring 5 having a truncated wedge cross-section such that the truncated portion of the wedge abuts the rabbet on the core member.

In use, an end cap 6 is heated to melt one major surface 7 thereof and this is then forced against the body of the filter device such that the ends of the pleats of the filter medium and the end densification ring and the cage member become sealed into the end cap.

FIGS. 2a and 2b illustrate in greater detail the end densification ring appearing in FIG. 1. The acute angle $\theta$ is the hypothetical angle between the external sloping surface of the wedge-shaped ring and the hypothetical continuation of the surface of the core member. Clearly, the size of the angle $\theta$ and the axial length L of the ring control the amount of densification that occurs at the pleat end. The larger the values of $\theta$ and L the greater the densification that will occur.

Figure 5:
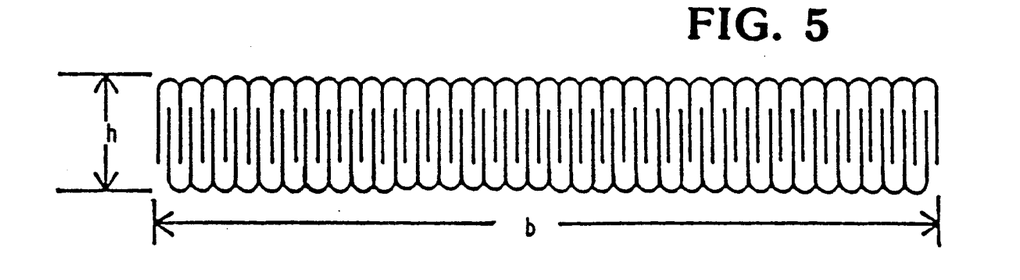
FIG. 5 is a schematic cross-section of the pleated filter element before it is formed into the cylindrical shape required in the cartridge. It is also provided to identify the various dimensions used in the specification.

This densification concept is expressed mathematically as a densification factor or DF. This is derived by the following calculation. Reference is made to FIGS. 4 and 5 for the significance of the various terms used.

The cross-sectional area, $A_1$, of the filter end actually occupied by the filter member is calculated by measuring the dimensions of the filter pack in a flat and also in a fully dense state as shown in FIG. 5.

The Area, $A_1$, is then given by $A_1 = bh$. This is in the "flat" form before it is formed into a cylinder. In the flat configuration there are no void areas such as are formed when the pleated element is formed into a cylinder thus separating the apices of the pleats.

The Area, $A_2$, occupied by the filter end in the cylindrical pack form is determined by $$A_2 = \pi(R_f^2 - R_c^2).$$

The difference in areas in the fully dense state and in the final filter shape is the void area, $A_V$, of the filter end:

$$A_V = A_2 - A_1$$

$$A_V = \pi(R_I^2 - R_O^2) - bh$$

The final cross-sectional area, $A_F$, occupied by the filter when densified by the pack end ring is given by $$A_F = \pi(R_I^2 - R_R^2)$$

where $R_R = R_O + X$
or $A_F = \pi[R_I^2 - (R_O + X)^2]$.

The final area of voids, $A_{VF}$, in the cross-sectional area with the pack densification installed is given by $$A_{VF} = A_F - A_1$$

or $$A_{VF} = \pi[R_I^2 - (R_O + X)^2] - bh.$$

The required dimension, X, which is a measure of the maximum reduction, in the radial direction, of the space occupied by the filter end in its densified state, may then be determined by $$X = \left[ R_I^2 - \frac{A_{VF} + bh}{\pi} \right]^{\frac{1}{2}} - bh.$$

If we define a desired densification factor, $D_F$, such that $$D_F = \frac{A_V - A_{VF}}{A_V}$$

or $$A_{VF} = (1 - D_F)A_V.$$

It should be noted that, if the filter element is somewhat loosely consolidated, the end densification ring could compress the material of the pleats as well as compact the pleats together such that $A_F$ could be less than $A_1$. Thus, $A_{VF}$ could be a negative figure and therefore $D_F$ could be greater than 1.

Then, having once defined a derived densification factor, $D_F$, it is possible to deduce the necessary end densification ring dimensions to achieve that degree of densification:

$$X = [D_F(R_I^2 - bh/\pi) + (1 - D_F)R_O^2]^{\frac{1}{2}} - R_O$$

and $$b_2 = b_1 + X.$$

Generally, the axial length of the ring L is chosen such that the angle $\theta$ is from about 15° to about 30° and preferably from about 18° to about 23°.

EXAMPLE

This example describes a specific filter device according to the invention and is not intended in any way to limit or imply any limitation on the essential scope thereof.

One embodiment of an end densification ring was incorporated into a particular filter configuration to illustrate the attainment of the objectives of the invention. The filter chosen was rated for absolute removal of 0.2 micrometer size particles. The filter member consisted of a 0.003 inch thick polytetrafluoroethylene expanded membrane with a 0.012 inch thickness of nonwoven polypropylene on the upstream side and a 0.018 thickness of the same material on the downstream side. The filter member was pleated on a conventional reciprocating pleater with a pleat height of 0.405 inch. The filter had cage, core, and end cap members molded from polypropylene. The dimensions of the filter, using the parameters discussed above with respect to FIGS. 4 and 5, were:

| h = 0.405″ | $R_O$ = 0.6325″ |
|---|---|
| b = 4.400″ | RI = 1.0575″ |
| | $b_1$ = 0.30″. |

End densification rings were constructed so as to provide densification factors, $D_F$, of 0.71 and 0.94. The dimensions of the larger height of the ring cross-sections, $b_2$, were determined to be 0.110 inch and 0.135 inch, respectively. A single value for the length of the ring, L, was chosen at 0.25 inch. This resulted in values for the wedge angle, $\theta$, of 18° and 23°.

Table 1 summarizes the results attained by incorporating these end densification rings into the above filters.

TABLE 1

| End Densification Ring Compress Factor | Percent of Filters Passing Seal Integrity Test | Average Leakage for Passing Filter (cc/min) |
|---|---|---|
| .71 | 95 | 0.667 |
| .94 | 97 | 0.720 |
| No Ring | 55 | 2.166 |

The data in the third column represent the results of a standard production acceptance test. The test measures the rate of air flow through the filter in the forward direction after the filter has been wetted with a solution of tertiary butyl alcohol and water. In this series of tests a differential pressure of 12.2 psi was applied to the filter and the resulting flow was measured in cc/min. When the calculated diffusional flow (0.9 cc/min in this embodiment) is subtracted from the total, the remaining leakage flow is a measure of flow through "holes" in the filter, side seals, and end seals. The average value of this leakage flow for each case is shown in column 3.

The results clearly show that embodiments with the above densification factors attain the objects of the invention.

I claim:

1. A filter cartridge comprising a porous cylindrical core member, end caps at opposed ends of the cartridge, and, disposed around the core member and retained in the cartridge by the end caps, a cylindrical pleated filter element with the axes of the pleats extending generally parallel to the axis of the core member, the cylindrical pleated filter element having ends which are bonded to the end caps, and an end densification ring having a generally wedged-shaped cross-section located in the area adjacent at least one end cap so as to restrict the local radial dimension of the space occupied of the pleated filter element such that the portions of the pleats in contact with the ring are reshaped to thereby compact the pleats in close proximity to one another.

2. A filter cartridge according to claim 1 in which the end densification ring is applied to an end of the core member and has a generally wedge-shaped cross-section.

3. A filter cartridge according to claim 2 in which the wedge has a wedge angle of from about 18° to about 23°.

4. A filter cartridge according to claim 1 in which the portions of the pleats in contact with the end densification ring have a densification factor of from about 0.5 to about 1.1.

5. A filter cartridge according to claim 4 in which the densification factor is from about 0.7 to about 0.9.

6. A filter cartridge according to claim 1 which further comprises a cylindrical cage surrounding the pleated filter element and sealed with it in the end cap of the cartridge.

7. A filter cartridge according to claim 6 in which the end densification ring is fitted to the cage member.

8. A filter cartridge according to claim 1 in which the end densification ring is provided with slots to allow the escape of gases.

9. A filter cartridge according to claim 1 in which the end densification ring is an integral part of the core member.

10. A filter cartridge according to claim 1 in which the core member is rabbeted adjacent an end and the end densification ring has a truncated wedge cross-section such that the truncated portion of the wedge is accommodated in the rabbet of the core member.

11. A filter cartridge according to claim 1 in which end densification rings are provided at both ends of the cartridge.

12. A filter cartridge according to claim 1 in which the end densification ring and the core member are provided with means for insuring a locking fit when the end densification ring is located on the core member.

13. A filter cartridge according to claim 1 in which the end densification ring is made from a polymer that has a melting point above the temperature at which the ends of the pleats are sealed in the end cap.

14. A filter cartridge according to claim 1 in which the end densification ring is made from a polymer of a fluorinated or unfluorinated olefin.

15. A filter cartridge according to claim 1 in which the ends of the pleats of the filter element are sealed into the body of the end cap.

16. A filter cartridge according to claim 1 wherein said at least one end cap includes a potting compound and wherein the compacted pleats of the pleated filter element are sealed into the potting compound.

17. A filter cartridge comprising a porous cylindrical core member end caps at opposed ends of the cartridge, and, disposed around the cylindrical core member and retained in the cartridge by the end caps, a cylindrical pleated filter element with the axes of the pleats extending generally parallel to the axis of the cylindrical core member, and, fitted over an end of the core member, an end densification ring having a generally wedged-shaped cross-section with a wedge angle of from about 18° to about 23°, said end densification ring acting to restrict the local radial dimension of the space occupied by the pleated filter element such that the pleats, in the area in contact with the ring, are reshaped to thereby compact the pleats in close proximity to one another.

18. A filter cartridge according to claim 17 in which the end densification ring is provided with slots to allow for the escape of gases.

19. A filter cartridge according to claim 17 in which the core member is rabbeted adjacent an end and the end densification ring has a truncated wedge cross-section such that the truncated portion of the wedge is accommodated in the rabbet of the core member.

20. A filter cartridge according to claim 17 in which end densification rings are provided at both ends of the cartridge.

21. A filter cartridge according to claim 17 in which the end densification ring and the end cap are both made from olefinic polymer.

22. A filter cartridge according to claim 17 in which the ends of the pleats of the filter element are sealed into the body of the end cap.

23. A filter cartridge according to claim 17 wherein at least one end cap includes a potting compound and wherein the compacted pleats of the pleated filter element are sealed into the potting compound.

24. A filter cartridge comprising a porous cylindrical core member, end caps at opposed ends of the cartridge, and disposed around the core member and retained in the cartridge by the end caps, a cylindrical pleated filter element with the axis of the pleats extending generally parallel to the axis of the core member, the pleated filter element including at least one of a polymeric material and a glass fiber material, and means, including an end densification ring, located in the area adjacent at least one end cap for restricting the local radial dimension of the space occupied by the pleated filter element, thereby compacting the pleats in the vicinity of the end densification ring, and causing the pleated filter element to have a densification factor of from about 0.7 to about 0.9.

25. A filter cartridge according to claim 24 wherein said at least one end cap includes a potting compound and wherein the compacted pleats of the pleated filter element are sealed into the potting compound.

26. A filter comprising a cylindrical pleated filter element including a first end and axially extending pleats, the pleated filter element including at least one of a polymeric material and a glass fiber material, means, including an end densification ring, located near the first end of the pleated filter element for restricting the radial dimension of the pleated filter element and thereby compacting the pleats at the first end of the pleated filter element, and an end cap bonded to the first end of the pleated filter element.

27. A filter cartridge according to claim 26 further comprising a porous cylindrical core member, wherein the pleated filter element is disposed around the core member and the end densification ring is mounted to the core member.

28. A filter cartridge according to claim 27 wherein the core member includes a rabbet and the end densification ring is accommodated in the rabbet of the core member.

29. A filter cartridge according to claim 26 wherein the end densification ring has a generally wedge-shaped cross-section.

30. A filter cartridge according to claim 27 wherein the wedge has a wedge angle of about 18° to about 23°.

31. A filter cartridge according to claim 27 wherein the end densification ring has a truncated wedged cross-section.

32. A filter cartridge according to claim 26 wherein the end densification ring includes slots which allow the escape of gases.

33. A filter cartridge according to claim 26 wherein the end cap includes a potting compound and wherein the compacted pleats of the pleated filter element are sealed into the potting compound.

34. A filter cartridge comprising a cylindrical pleated filter element including a first and axially extending pleats, the pleated filter element including at least one of a polymeric material and a glass fiber material, means,

35. A filter cartridge according to claim 34 wherein the end cap includes a potting compound and wherein the compacted pleats of the pleated filter element are sealed into the potting compound.

36. A filter cartridge comprising a cylindrical pleated filter element including a first end and axially extending pleats, the pleated filter element including at least one of a polymeric material and a glass fiber material, means including an end densification ring, located near the first end of the pleated filter element for circumferentially displacing and compacting the pleats at the first end of the pleated filter element and an end cap bonded to the first end of the pleated filter element.

37. A filter cartridge according to claim 36 wherein the end cap includes a potting compound and wherein the compacted pleats of the pleated filter element are sealed into the potting compound.

* * * * *

UNITED STATES PATENT AND TRADEMARK OFFICE
CERTIFICATE OF CORRECTION

PATENT NO. : 5,130,023

DATED : July 14, 1992

INVENTOR(S) : Stephen D. Feint

It is certified that error appears in the above-identified patent and that said Letters Patent is hereby corrected as shown below:

Claim 17, column 7, line 58, after "member" insert --,--.

Claim 34, column 9, line 14, change "," (second occurrence) to
-- including an end densification ring located near the first end
of the pleated filter element for uniformly restricting the
radial dimension of the pleats at the first end of the pleated
filter element and thereby compacting the pleats at the first
end of the filter element, and an end cap bonded to the first
of the pleated filter element.--.

Signed and Sealed this

Nineteenth Day of October, 1993

BRUCE LEHMAN

Attest:

Attesting Officer

Commissioner of Patents and Trademarks